United States Patent [19]

Kaneda

[11] Patent Number: 5,153,629
[45] Date of Patent: Oct. 6, 1992

[54] CAMERA APPARATUS

[75] Inventor: Naoya Kaneda, Kanagawa, Japan

[73] Assignee: Canon Kabushiki Kaisha, Tokyo, Japan

[21] Appl. No.: 700,088

[22] Filed: May 6, 1991

Related U.S. Application Data

[63] Continuation of Ser. No. 410,290, Sep. 21, 1989, abandoned.

[30] Foreign Application Priority Data

Sep. 26, 1988 [JP] Japan .................. 63-242041

[51] Int. Cl.$^5$ ............................................. G03B 13/00
[52] U.S. Cl. ............................. 354/400; 354/289.12
[58] Field of Search ........................... 354/400–409, 354/412, 289.12

[56] References Cited

U.S. PATENT DOCUMENTS 4,792,819  12/1988  Akashi .................................. 354/400
4,841,327  6/1989  Yamamoto et al. ................ 354/412

Primary Examiner—L. T. Hix
Assistant Examiner—David M. Gray
Attorney, Agent, or Firm—Robin, Blecker, Daley & Driscoll

[57] ABSTRACT

A camera apparatus has an interchangeable lens unit and a transmission line for exchange of information with the lens unit. The lens unit has at least one driving part which is arranged to change the optical condition of the lens unit. The camera system includes a control circuit which is arranged to take in, from the lens unit via the transmission line, information on at least on of the maximum and minimum possible driving speeds of the driving part; to set a driving speed of the driving part within the possible driving speed range of the driving part; and to transmit information on the set driving speed to the lens unit.

32 Claims, 12 Drawing Sheets

FIG.3

| n MOTOR SPEED NO. | ΔZn SPEED OF CHANGE OF CIRCLE OF CONFUSION IN TELEPHOTO END AT FULL APERTURE |
|---|---|
| 0 | 0 (STOP) |
| 1 | 0.32 mm/sec |
| 2 | 0.45 |
| 3 | 0.65 |
| 4 | 0.89 |
| 5 | 1.28 |
| 6 | 1.79 |
| 7 | 2.55 |
| 8 | 3.57 |

FIG.4

| n | ΔZn | SPEED FROM ∞ TO 1.2m (FULL APERTURE F=1.4, CLOSEST FOCUSING DISTANCE=1.2m) | | |
|---|---|---|---|---|
| | | fT=100mm | fT=72mm | fT=54mm |
| 0 | 0 | — | — | — |
| 1 | 0.32 | 22 sec | 11 sec | 6.4 sec |
| 2 | 0.45 | 16 sec | 8.3 sec | 4.7 sec |
| 3 | 0.65 | 11 sec | 5.7 sec | 3.2 sec |
| 4 | 0.89 | 8 sec | 4.1 sec | 2.3 sec |
| 5 | 1.28 | 5.6 sec | 2.9 sec | (1.6 sec) |
| 6 | 1.79 | 4 sec | 2.1 sec | ( 1.2 sec ) |
| 7 | 2.55 | 2.8 sec | (1.5 sec) | ( 0.8 sec ) |
| 8 | 3.57 | (2 sec) | ( 1.0 sec ) | ( 0.6 sec ) |

FIG.5

| n \ F | 1.4 | 2.8 | 5.6 | 11 | 22 |
|---|---|---|---|---|---|
| 0 | 0 | 0 | 0 | 0 | 0 |
| 1 | 0.32 | 0.16 | 0.08 | 0.04 | 0.02 |
| 2 | 0.45 | 0.23 | 0.11 | 0.06 | 0.03 |
| 3 | 0.65 | 0.32 | 0.16 | 0.08 | 0.04 |
| 4 | 0.89 | 0.45 | 0.23 | 0.11 | 0.06 |
| 5 | 1.28 | 0.65 | 0.32 | 0.16 | 0.08 |
| 6 | 1.79 | 0.89 | 0.45 | 0.23 | 0.11 |
| 7 | 2.55 | 1.28 | 0.65 | 0.32 | 0.16 |
| 8 | 3.57 | 1.79 | 0.89 | 0.45 | 0.23 |

($\Delta Z_n$)

FIG.6

| F | 1.0–2.0 | 2.0–4.0 | 4.0–8.0 | 8.0–16.0 | 16.0– |
|---|---|---|---|---|---|
| $K_F$ | 1 | 2 | 3 | 4 | 5 |

| f (mm) | 80–110 | 56–80 | 40–56 | 28–40 | 20–28 | 14–20 | 10–14 |
|---|---|---|---|---|---|---|---|
| $K_f$ | 1 | 2 | 3 | 4 | 5 | 6 | 7 |

FIG.7
| n | MOTOR DUTY RATIO | DRIVING PATTERN |
|---|---|---|
| 8 | ALWAYS ON |  |
| 7 | ON OFF<br>10 : 4 |  |
| 6 | 10 : 10 |  |
| 5 | 10 : 18 |  |
| 4 | 10 : 30 |  |
| 3 | 10 : 45 |  |
| 2 | 10 : 70 |  |
| 1 | 10 : 100 | |
FIG.8
| f \ F | 1.4 | 2.8 | 5.6 | 11.0 | 22.0 | — |
|---|---|---|---|---|---|---|
| | 1.0~2.0 | 2.0~4.0 | 4.0~8.0 | 8.0~16.0 | 16.0~32.0 | 32.0~ |
| 80~110 | 0 | 1 | 2 | 3 | 4 | 5 |
| 56~80 | 1 | 2 | 3 | 4 | 5 | 6 |
| 40~56 | 2 | 3 | 4 | 5 | 6 | 7 |
| 28~40 | 3 | 4 | 5 | 6 | 7 | 8 |
| 20~28 | 4 | 5 | 6 | 7 | 8 | 9 |
| 14~20 | 5 | 6 | 7 | 8 | 9 | 10 |
| 10~14 | 6 | 7 | 8 | 9 | 10 | 11 |
$\Delta K$ ACCORDING TO f AND F (fT=100mm, F0=1.4)

FIG.9

| ΔK | 0 | 1 | 2 | 3 | 4 | 5 | 6 | 7 | 8~11 |
|---|---|---|---|---|---|---|---|---|---|
| LITTLE BLUR | 1 | 3 | 5 | 7 | 8 | 8 | 8 | 8 | 8~8 |
| MIDDLE BLUR | 2 | 4 | 6 | 8 | 8 | 8 | 8 | 8 | 8~8 | n ACCORDING TO ΔK

FIG.10

| f \ F | 1.4 | 2.8 | 5.6 | 11.0 | 22.0 | — |
|---|---|---|---|---|---|---|
|  | 1.0~2.0 | 2.0~4.0 | 4.0~8.0 | 8.0~16.0 | 16.0~32.0 | 32.0~ |
| 40~56 | 0 | 1 | 2 | 3 | 4 | 5 |
| 28~40 | 1 | 2 | 3 | 4 | 5 | 6 |
| 20~28 | 2 | 3 | 4 | 5 | 6 | 7 |
| 14~20 | 3 | 4 | 5 | 6 | 7 | 8 |
| 10~14 | 4 | 5 | 6 | 7 | 8 | 9 |
| 7~10 | 5 | 6 | 7 | 8 | 9 | 10 |

ΔK ACCORDING TO f AND F (fT=54mm, F0=1.4)

CAMERA APPARATUS

This application is a continuation of Ser. No. 07/410,290 filed Sep. 21, 1989, now abandoned.

BACKGROUND OF THE INVENTION

1. Field of the Invention

This invention relates to a camera apparatus consisting of a camera body and a lens system which is detachably attached to the camera body and more particularly to a control device for controlling a plurality of driving means including driving means for automatic focus adjustment, driving means for zooming, driving means for automatic exposure adjustment, etc., which are disposed on the side of the lens system.

2. Description of the Related Art

In order to provide a video camera or the like with an automatic focusing (hereinafter referred to as AF), a power zooming (hereinafter referred to as PZ) and an automatic exposure adjustment (hereinafter referred to as AE) function, the conventional video camera has been arranged as follows: With respect to the AF function, the details of speed control over driving means (for shifting a focusing lens group) are determined according to the various characteristics of the photo-taking lens mounted on the camera, such as a focal length f (mm) and an aperture value F in such a manner as to obtain an adequate distance measuring performance. As for the AE function, the details of optimum driving control are determined in such a way as to preclude hunting of a diaphragm in the neighborhood of an apposite aperture value. As regards the PZ function, the camera is arranged to give the advantage of selecting an optimum angle of view.

However, in the event of a camera system permitting the use of interchangeable lenses, the above-stated control must be applicable to a plurality of lenses. The control must be performed appositely to the characteristics such as the zoom ratio, the focal length and the full aperture F-number of each of these lenses. Otherwise, there would arise the following problems:

With respect to the AF function: An AF action either very much delays before attainment of an in-focus state or cannot be stably accomplished because of continuous hunting of a focusing lens group occurring near an in-focus position.

With respect to the AE function: An AE action, like the AF action, either very much delays before attainment of an apposite exposure or cannot be stably performed because of continuous hunting occurred near an aperture value required for the apposite exposure.

With respect to the PZ function: The effect of natural variations in angle of view cannot be obtained.

In a conceivable solution of these problems, driving speeds are specified in some suitable form for the driving means as criteria to be observed within a lens-interchangeable system. With the speeds thus specified in common for the driving means of lenses, it would enable the camera to adequately perform driving control over a plurality of lenses of different characteristics.

With regard to AF driving means, as applied to an interchangeable lens, the following describes the above-stated speed control method. The speed criterion is assumed to be specified as follows: Under a condition where the varying degree $\Delta Z$ mm of a circle of confusion occurring when the focusing lens of the lens system is shifted $\Delta A$ mm becomes a maximum value (this condition occurs at the longest focal length, i.e., a telephoto end, and at the full aperture in the case of a zoom lens consisting of four lens groups in general), the varying degree $\Delta Z$ mm resulting from the shift of lens $\Delta A$ mm can be made unvarying by the driving speed for a given period of time t sec. Assuming that the focal length at the telephoto end is fT mm, a degree of position sensitivity of a focusing lens group is So and a full aperture F-number is Fo, the above-stated relation can be expressed as $\Delta Z = So \times \Delta A / Fo$. Therefore, in order to make the value $\Delta Z$ unvarying by determining the speed for each lens in accordance with the above-stated specified criteria, the value $\Delta A$ mm varies with the lens in use. A method of using the above-stated value $\Delta Z$ as a speed determining criterion is disclosed in U.S. patent application Ser. No. 385,306 filed on Jul. 25, 1989.

The prior art method described above is theoretically capable of enabling each of the AF, AE and PZ actions to be approximately uniformly accomplished for all the lenses of different characteristics. In actually arranging the lenses, however, the method presents various problems including the difficulty of driving at all the prescribed speeds due to the limited dynamic ranges of the driving means; the necessity of use of expensive driving means capable of coping with a wide range of speeds including some speeds that are not actually used; and the necessity of use of a complex control circuit.

SUMMARY OF THE INVENTION

It is a first object of this invention to solve the above-stated problems by providing a highly advanced control system.

It is a second object of the invention to provide a camera system of the kind having a lens unit detachably mounted on a camera body, wherein the lens unit is promptly and stably controlled in a manner apposite to the driving parts thereof.

It is a third object of the invention to provide a camera system of the kind having a lens unit detachably mounted on a camera body, wherein the interchangeability for a plurality of lens units is enhanced by detecting the driving characteristic of each lens unit and by performing control according to the characteristic detected.

It is a fourth object of the invention to provide a camera system which is capable of stably and accurately performing driving control without changing its driving control characteristic according to the lens unit mounted on the camera body.

To attain the above-stated objects, a camera system which is of the kind having a camera body and a lens unit to be detachably mounted on the camera body and is arranged according to this invention as a preferred embodiment thereof comprises: communication means for communicating information between the lens unit and the camera body; an actuator disposed in the lens unit; driving control means arranged in the camera body to supply an actuator driving instruction signal to the actuator through the communication means; and limiting means arranged in the camera body to take in information on a driving characteristic of the actuator through the communication means and to impose a given limitation upon the actuator driving instruction signal by controlling the driving control means in accordance with the driving characteristic.

The embodiment which is arranged in this manner is capable of controlling the side to be controlled in an optimum manner by preventing any instruction for driving in excess of an operatable range. It is another feature of the camera system that the system is arranged to detect at least one of the maximum value and the minimum value of speed at which the actuator disposed in the lens unit can be driven is detected; and to limit the setting range of the actuator driving speed values on the side of the camera body on the basis of information on the result of detection.

It is a fifth object of the invention to provide a camera system comprising a lens unit including a driving part which is arranged to vary the optical state of the lens unit; and transmission means for transmitting to a camera body information on the possible range of driving speeds of the driving part in response to a request from the camera body; and control means arranged to limit a driving control signal for driving the driving part in accordance with the information on the possible driving speed range received from the transmission means.

It is a sixth object of the invention to provide a camera system of the kind controlling a lens unit by a control signal sent from a camera body, wherein there is provided a correction means arranged to detect the possible driving range of a driving part of the lens unit and to correct and adjust the control signal to a value within a range corresponding to the possible driving range detected, so that the driving part can be appositely controlled without loss according to the lens mounted.

It is a seventh object of the invention to provide a camera unit of a camera system, wherein the camera unit is capable of smoothly performing accurate driving control over a lens unit by producing an optimized driving control signal according to the lens unit mounted in such a way as to ensure that a control instruction issued from the camera unit always adequately matches with the driving state of the lens unit.

It is an eighth object of the invention to provide a driving control device which is capable of performing control according to the capability of a driving part to be controlled.

It is a ninth object of the invention to provide a lens-interchangeable type camera system, wherein: in cases where any of driving means provided on the side of the lens is incapable of meeting some of a plurality of driving speeds specified as the criterion for each driving means, an optimum speed is selected for control over each of the driving means according to the maximum and minimum possible speeds of the driving means; and if, despite of this, a normal operation is impossible, a warning is given in some suitable manner. Therefore, even in cases where an instruction is given for an impossible speed, the camera system according to this invention performs a normal operation as long as it is possible. This arrangement thus obviates the necessity of arranging each of driving means to be capable of meeting a wide range of specified driving speeds, so that they can be simply arranged. In addition to this advantage, the arrangement of a control circuit required for varying the driving speed can be also simplified.

Other objects and features of this invention will become apparent from the following detailed description of embodiments thereof taken in conjunction with the accompanying drawings.

BRIEF DESCRIPTION OF THE DRAWINGS

FIG. 3 shows speeds specified for the interchangeable lens driving means of the embodiment of the invention.

FIG. 4 shows the lengths of time required in shifting lenses of different telephoto end focal lengths between the infinity and 1.2 m distance positions.

FIG. 5 shows the value n of each speed No. obtained for various F-numbers as in relation to a speed at which the circle of confusion expands.

FIG. 6 shows Kf and KF conversion tables including coefficients Kf and KF to be allotted to different areas when an aperture value F and a focal length f (mm) are detected by divided areas.

FIG. 7 shows the patterns of duty ratios obtained for various speeds when the speed is controlled by the duty of a pulse motor.

FIG. 8 shows values $\Delta K$ obtained for different combinations of focal lengths and F-numbers when the focal length fT at the telephoto end is 100 mm and the full aperture F-number Fo is 1.4.

FIG. 9 is a conversion table for values $\Delta K$ and n.

FIG. 10 shows values $\Delta K$ obtained by different combinations of focal lengths and F-number values at fT=50 mm and Fo=1.4.

DETAILED DESCRIPTION OF THE PREFERRED EMBODIMENTS

Figure 1:
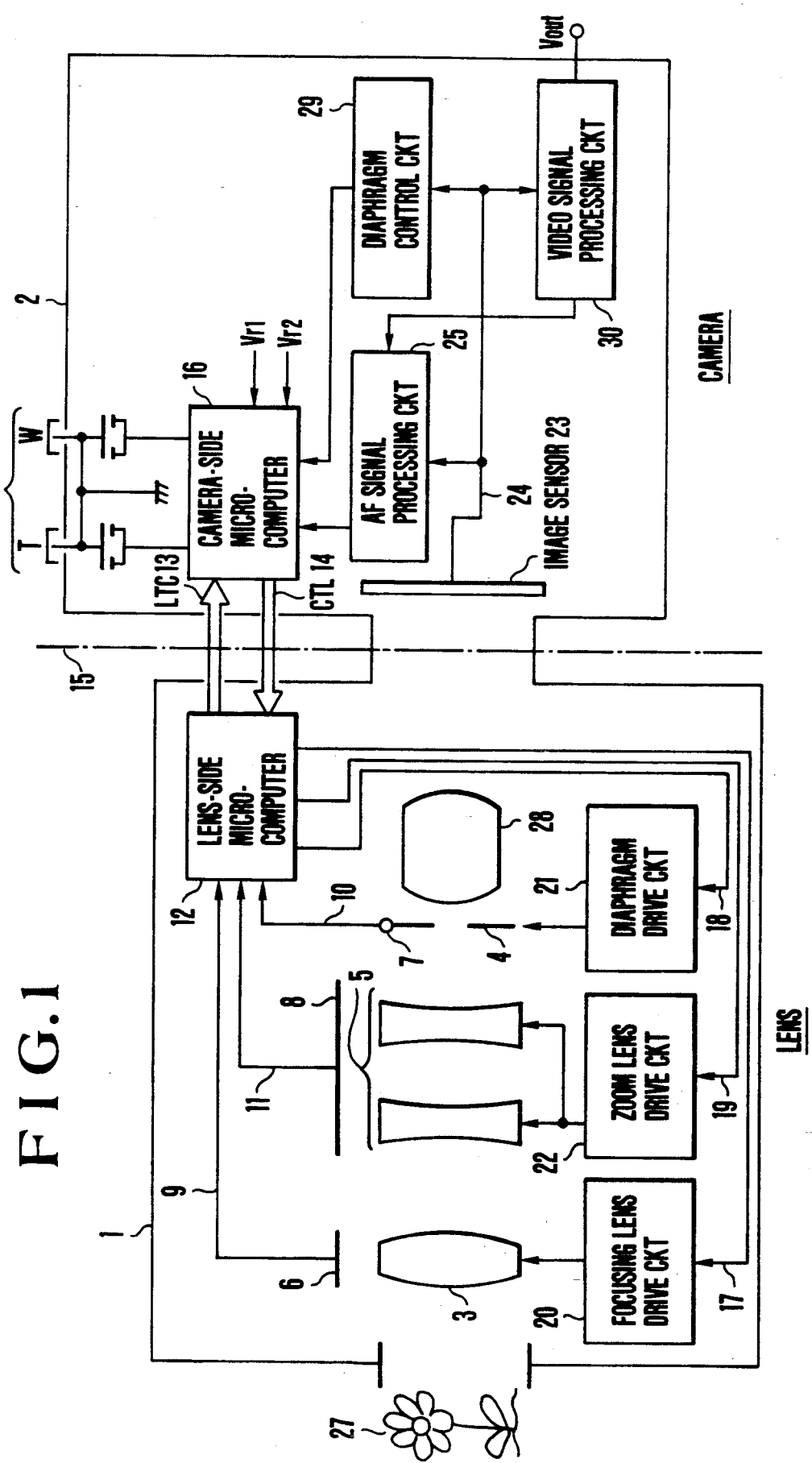
FIG. 1 is a block diagram showing an automatic focusing (AF) device arranged as an embodiment of this invention.

The details of the camera system according to this invention are as described below with reference to the accompanying drawings:

FIG. 1 is a block diagram showing the arrangement of a camera system suited for application of the invention. Referring to FIG. 1, a lens part 1 includes a lens system arranged according to this invention. A camera part 2 includes a microcomputer which mainly performs control on the side of the camera part. The camera system comprises a focusing lens 3; a diaphragm 4; a zooming lens 5; an encoder 6 which is arranged to detect the position of the focusing lens 3; an encoder 7 which is arranged to detect the aperture value of the diaphragm 4; an encoder 8 which is arranged to detect the position of the zooming lens 5; and transmission lines 9, 10 and 11 which are provided for sending, to a microcomputer 12 for control inside the lens part 1, the outputs of the encoders 6, 7 and 8 representing the detected positions of the focusing lens 3, the diaphragm 4 and the zooming lens 5 respectively. The microcomputer 12 on the side of the lens part 1 is arranged to read the information from the encoders; to have the focusing lens 3, the zooming lens 5 and the diaphragm 4 correctly driven in accordance with driving instructions coming from a microcomputer 16 disposed on the side of the camera part; and to send to the microcomputer 16 of the camera part the results of driving and various data about the lens. The system further comprises a transmission line 13 for sending information from the microcomputer 12 of the lens part to the microcomputer 16 of the camera part; a transmission line 14 for sending information from the camera microcomputer 16 to the lens microcomputer 12; a mount part 15 which is provided for connecting the lens part 1 to the camera part 2; the microcomputer 16 which is arranged on the side of the camera part 1 to perform an automatic focusing (AF) control function by sending driving instructions to the lens microcomputer 12 for forming on an image sensing plane an in-focus image of an object to be photographed; and transmission lines 17, 18 and 19 which are provided for sending driving instructions from the microcomputer 12 of the lens part to the drive circuits 20, 21 and 22 which are provided respectively for the focusing lens 3, the diaphragm 4 and the zooming lens 5.

In compliance with the driving instructions from the microcomputer 12 of the lens part, the drive circuits 20, 21 and 22 drive the focusing lens 3, the diaphragm 4 and the zooming lens 5 respectively. An image sensor 23 has an image sensing plane and is arranged to convert into an electrical signal an image of the object formed on the image sensing plane. A transmission line 24 is provided for sending a video signal obtained by the image sensor 23. A focus detection (AF) signal processing circuit 25 is arranged to convert the signal from the image sensor 23 into data suited for an automatic focus detecting process including information, for example, the amount of a high frequency component, the number of edge parts, etc. A zooming switch 26 is provided for moving the zooming lens 5. A reference numeral 27 denotes an object to be photographed. A relay lens 28 is stationary. A diaphragm control circuit 29 is arranged to control and adjust the aperture to an optimum value in such a way as to make the level of a luminance signal unvarying according to information, for example, on the level of the luminance signal from the image sensor 23.

A video signal processing circuit 30 is arranged to perform a prescribed signal processing operation on the signal from the image sensor 23, including, for example, gamma correction, a blanking process and a synchronizing signal adding process and to produce a standard TV signal from a video output terminal Vout.

With the camera system arranged in the manner as described above, the image of the object 27 which comes through the focusing lens 3, the zooming lens 5, the diaphragm 4 and the relay lens 28 is formed on the image sensing plane of the image sensor 23. The zooming lens 5 is arranged as follows: When the operator (or photographer) operates the zoom switch 26, the microcomputer 16 of the camera part selects an optimum speed "n" according to the lens characteristic. Information on the speed "n" and a rotating direction of driving means is then sent to the microcomputer 12 of the lens part via the transmission line 14 (CTL: camera to lens). The lens microcomputer 12 then sends the information to the zoom lens drive circuit 22. This enables the drive circuit 22 to set the zoom lens 5 in a desired position within its shiftable range. This position of the zoom lens 5 is detected by the zoom encoder 8. Information on the position thus detected is supplied via the transmission line 11 to the microcomputer 12 of the lens part (LTC: lens to camera).

The diaphragm 4 is controlled by the diaphragm control circuit 29 to make the quantity of light unvarying at the image sensor 23. In other words, as mentioned in the foregoing, the circuit 29 controls the diaphragm 4 to make the level of the signal produced from the image sensor 23 unvarying. A control signal thus obtained is sent to the microcomputer 16 of the camera part to be translated there into data for the optimum speed "n" and the rotating direction of the driving means. The data is sent via the transmission line 14 to the microcomputer 12 of the lens part. Then, the diaphragm drive circuit 21 performs an automatic exposure adjustment action accordingly. The aperture value thus obtained is constantly detected by the encoder 7. The aperture value is read via the transmission line 10 by the microcomputer 12 of the lens part and the above-stated control operation is repeated.

The video signal which corresponds to the object's image and is obtained from the image sensor 23 is converted by the AF signal processing circuit 25 into a signal representing a focused degree. The signal, for example, indicates the amount of a high frequency component included in the video signal and is used for a discrimination between in-focus and out-of-focus states. The signal indicating the focused degree is at a maximum level thereof at an in-focus point. The signal level becomes lower accordingly as the lens position deviates from the in-focus point. In the case of this invention, a plurality of threshold levels are set for the high frequency component level indicating the focused degree. In the event of an out-of-focus state, the degree of deviation from the in-focus point, i.e., a blurred degree, is detected by comparing the high frequency component level with the plurality of threshold levels.

Figure 2:
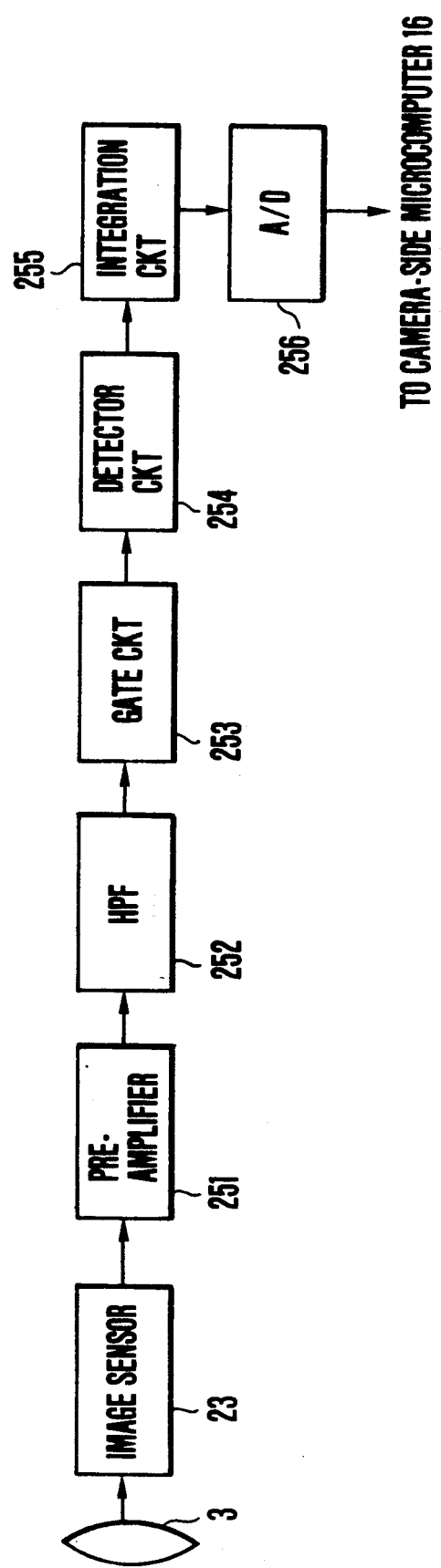
FIG. 2 is a block diagram showing the arrangement of an AF device suited for application of the invention.

FIG. 2 shows by way of example the internal arrangement of the AF signal processing circuit 25 which is arranged to perform the above-stated action. Referring to FIG. 2, the output of the image sensor 23 which is a CCD or the like is amplified to a given level by a preamplifier 251 disposed inside the AF signal processing circuit 25. A high-pass filter (HPF) 252 which may be replaced with a band-pass filter extracts a given high frequency component from the output of the preamplifier 251. The high frequency component extracted is supplied to a gate circuit 253. The gate circuit 253 is arranged to form a window pulse from vertical and horizontal synchronizing (hereinafter referred to as sync) signals produced from the video signal processing circuit 30 and to extract only a video signal part corresponding to a specific distance measuring area set on the image sensing plane of the image sensor 23. A high frequency component which is extracted by the gate circuit 253 from the signal part corresponding to the distance measuring area is subjected to a detecting action performed by a detector circuit 254. The output of the circuit 254 is supplied to an integration circuit 255 to be converted into a DC level corresponding to the amount of the high frequency component. This DC level is a signal which varies according to the focused degree and is nothing else but a focus voltage. The focus voltage is supplied to an analog-to-digital (A/D) converter 256 to be converted into a digital signal. The digital signal is supplied to the microcomputer 16 of the camera part. On the side of the microcomputer 16, the focus voltage is stored at a memory. The level of the focus voltage newly supplied is compared with that of the focus voltage previously obtained and stored at the memory in a cycle of one field period. An instruction is produced to drive the focusing lens 3 to shift it in the direction of lessening a difference between the current level of the focus voltage and the previous level of the focus voltage. At the same time, the level of the focus voltage supplied is compared with the plurality of threshold levels Vr1 and Vr2 which have been set beforehand. By this comparison, the deviating degree of the current lens position from the in-focus point, that is, a blurred or defocus degree is detected. The blurred degree thus detected is used for determining a speed at which the focusing lens 3 is to be driven. In other words, in the automatic focus detecting system of this embodiment, the above-stated blurred degree is detected step by step; and the lens driving speed is lowered when the blurred or defocus degree becomes small and, after that, the focusing lens is brought to a stop when it reaches the in-focus point.

The AF signal processing circuit 25 which is arranged as described above, can be considered to be directly detecting the blurred degree (or the circle of confusion) obtained on the image sensing plane. A focusing action can be carried out to attain an adequate in-focus state with this AF signal processing circuit 25, therefore, by performing driving control to have a circle-of-confusion varying degree $\Delta Z$ unvarying within a given period of time t sec mentioned in the foregoing (hereinafter referred to as a circle-of-confusion varying speed). In other words, this driving control enables the embodiment to accomplish the focusing action until an in-focus state is attained approximately in the same manner for every one of interchangeable lenses of different lens characteristics.

FIG. 3 shows an example of specified common information on the above-stated driving speeds. In this instance, the AF driving speeds "n" of the driving means are stipulated to be in eight speeds including speeds numbers n=1 to 8 and n=0 for a stop. The symbol "n" denotes the speed No. and $\Delta Zn$ the circle-of-confusion varying degree obtained, for example, during a period of 1 sec.

The above-stated concept necessitates selection of the optimum driving speed "n" on the basis of the focal length f mm and the aperture value F for each lens currently mounted on the camera. For example, if a lens which is driven at the speed n=1 in a little blur state of $\Delta Zn = 0.32$ mm/sec in the case of focal length fT=100 mm and full aperture F-number Fo 1.4 still remains in a little blur state when the lens is at a focal length f=50 mm and an aperture value F 2.8, the lens must be driven at the speed of n=7 as the driving speed must be increased, as well known, to a speed proportional to $(f/fT)^2$ and $(F/Fo)$ in order to obtain a speed most close to 0.32 mm/sec.

Further, fundamentally, when an instruction is received from the camera part for "n", the driving means shifts at a speed for a circle-of-confusion enlarging speed $\Delta Zn$ (at the telephoto end and the full aperture) corresponding to the instructed speed No.. For example, the speed n=1 does not have to bring about the varying speed $\Delta Zn = 0.32$ when the lens is not at its telephoto end and its full aperture. In that instance, at the same driving speed n=1, the circle-of-confusion varying speed becomes a lower speed which can be computed by the following formula:

$$\Delta Zn = ZnX(f/fT)^2X(F/Fo)$$

Conversely stated, at the same driving speed "n", the rotating speed of a distance ring remains unchanged irrespectively of the focal length f and the aperture value F as long as the lens is not replaced with another lens. Therefore, if the lens is replaced with another lens which is of a different specified focal length fT and a different full aperture value Fo at its telephoto end position, the distance-ring-rotating time required, for example, in shifting the lens between an infinity focusing distance position to a 1.2 m focusing distance position differs from that of the lens previously mounted, because the value $\Delta Zn$ remains unchanged.

The above-stated determining action is performed by the computing operation of control means which consists of the microcomputers, etc. disposed inside the camera and lens parts. The driving means is then driven according to the result of the computing operation. The embodiment is arranged to have eight different driving speeds. However, this number of driving speeds may be changed as desired.

While the method for controlling the driving means for the AF of an interchangeable lens type camera system has been described above, the driving speeds for AE and PZ must also be somehow specified as criteria. Each of the driving means of different lenses must be arranged to be correctly driven on the basis of the speed specification. For example, the driving speeds are specified in the form of EV values in the case of the AE function and in the form of focal length shifting time from the longest (telephoto end) to the shortest end (wide-angle end) for the PZ function.

With respect to the AF function, the AF signal processing circuit 25 determines the defocus degree and makes a discrimination between near- and far-focus states on the distance measurement principle as described with reference to FIG. 2 in the foregoing. In addition to the results of the distance measuring operation, the current focal length f mm and the current aperture value F are considered according to the above-stated setting value of the circle-of-confusion varying speed $\Delta Zn$. The microcomputer 16 of the camera part computes an optimum driving speed "n" on the basis of these data. Information on the speed "n" and the distance-ring rotating direction is sent to the microcomputer 12 of the lens part. Then, the focusing lens driving part 20 makes an automatic focus adjusting action accordingly. The position of the focusing lens 3 is read out by the encoder 6. The position information thus obtained is supplied via the transmission line 11 to the microcomputer 12 of the lens part.

In addition to the arrangement described above, the first embodiment of the invention has the microcomputer 12 of the lens part arranged to send, via the transmission line 13 to the microcomputer 16 of the camera part, information on the lowest possible driving speed value $n_{MIN}$ and the highest possible driving speed value $n_{MAX}$ of each of the focusing lens drive circuit 20, the diaphragm drive circuit 21 and the zoom lens drive circuit 22. Then, the microcomputer 16 of the camera part determines a driving speed "n" for each of these drive circuits to be in a relation of $n_{MIN} \leq n \leq n_{MAX}$. In cases where the speed "n" determined under the condition of $n_{MIN} \leq n \leq n_{MAX}$ is considered to likely bring about a problem for each of the AF, AE and PZ actions, the arrangement of the embodiment enables the camera system to inhibit a video recording operation or to give a warning.

To show the details of the first embodiment, the AF function thereof is further described by way of example among other functions. The focusing lens drive circuit which is provided for the AF function is assumed to have its driving speeds set as shown in FIG. 3. Assuming that three interchangeable lenses which are of a full aperture value F 1.4 and the closest focusing distance of 1.2 m are arranged to have focal lengths fT of 100, 72 and 54 mm at their telephoto ends respectively, the results of an approximate computing operation on the lens shifting lengths of time required in shifting their focusing lens groups for focusing from one end (an infinity focusing distance position) to the other end (a 1.2 m focusing distance position), according to the specification of FIG. 3, are as shown in FIG. 4. As shown, the length of time required in shifting the focusing lens from the infinity focusing distance end to the closest focusing distance end at the driving speed n=1 is 6.4 sec for the telephoto end focal length fT=54 mm while the length of time is 22 sec for the telephoto end focal length fT=100 mm. The former is shorter and is about ¼ of the latter in the case of length of time required for shifting the lens from the infinity focusing distance end to the closest focusing distance end. In the case of driving speed n=8, the lens of fT=100 mm takes 2 sec while the lens of fT=54 takes 0.6 sec.

In order to make this interchangeable lens type camera system of this embodiment capable of adequately handling all the lenses for all the eight steps (nine including the zero speed) of driving speeds, the camera system must be arranged to have the length of time required in shifting the focusing lens position from the infinity focusing distance end to the closest focusing distance end arranged to decrease accordingly as the telephoto end focal length fT becomes shorter. To ensure an adequate time in lens shifting from the infinity focusing distance end to the closest focusing distance end for actual lens arrangement, a torque required for shifting (rotation torque in the event of helicoidal delivery) and a lead in the case of a helicoidal arrangement are taken into consideration. The lens position can be shifted from one end to the other end of the shiftable range within the shorter specified time of 0.6 sec by arranging the rotation angle between one end and the other of a distance measuring operation ring to be small.

In some cases, however, the lens position shifting speed from one end to the other is required to be unvarying for the purpose of facilitating a manual adjustment operation and for making operation feeling unvarying between one lens and another. Such arrangement is suited for a case where the blurred degree is determined to be excessive (Vr<Vr2) by the AF signal processing circuit 25 as described in the foregoing with reference to FIGS. 1 and 2, because: A faulty action, such as hunting, would result from a mechanical unvarying speed at which the lens position is shifted from the infinity focusing distance end to the closest focusing distance end when the lens does not much deviate from its in-focus position. The mechanism of occurrence of such a faulty action is believed to be as follows:

With the AF signal processing circuit 25 assumed to be operating for a video camera, determination of a near-focus, far-focus or in-focus state and a blurred degree is made in a cycle of once for every frame period which is 1/30 sec. The circle-of-confusion varying speed $\Delta Zn$ specified for the driving speed No. 1 as shown in FIG. 4 is 0.32 mm/sec. When reduced to the variation taking place within the period of one cycle, this speed value becomes $0.32/30 \approx 0.01$ mm. In this instance, therefore, if the circle-of-confusion considered to be in focus is more than 0.01 mm, it is impossible to have, for example, a near-focus determination made at one cycle never changes to be determined as a far-focus state 1/30 sec after during a next cycle. The determination to be made for the next cycle is either a near-focus or in-focus determination. No hunting occurs in this instance. However, a circle of confusion less than 0.01 mm brings about this problem. Therefore, in the case of a little or middle blur state close to an in-focus point, each AF device must observe a driving speed for less than a necessary circle-of-confusion varying speed. Whereas, if the circle-of-confusion varying speed is too slow in the event of a great blur state, the focus voltage Vr which is used for a discrimination between near-focus and far-focus states fails to show any clear difference therein and thus might result in a faulty action. However, the range of speeds permitting accurate detection of the defocus (or blurring) direction is relatively wide. If the speed is not extremely slow in determining the direction of a great blur state, the occurrence of the problem can be avoided in most cases by changing the taking-in cycle of the focus voltage Vr for detecting the direction through a software arrangement, without exactly conforming to the specified value of $\Delta Vr$, in such a way as to have the speed set at a value, which is clearly higher than in the case of a little or middle blur state.

Therefore, while the slow speeds of the speed numbers n=1, 2, 3, . . . must be arranged to be commonly applicable to every one of the interchangeable lenses, the higher speeds may be limited to a speed of 1.5 sec or thereabout for moving between the infinity focusing distance end and the closest focusing distance end, considering the operability of the camera system, its actual operation and the capacity of the driving means. The lack of speeds higher than the above-stated high speed limit does not show any problem in most cases.

In view of this, among the speeds specified for each lens as shown in FIG. 4, circled speeds indicate upper limit speeds and parenthesized speeds indicate such high speeds that are considered to present no problem in most cases where they are not available in the actual operation. The upper limit speed is set at the driving speed n=8 for fT=100 mm, at n=7 for fT=72 mm and at n=5 for fT=54 mm.

FIG. 5 shows how the circle-of-confusion varying speed $\Delta Zn$ changes when, for example, the diaphragm of a lens having a full aperture value F of 1.4 is stopped down with the lens fixed to its telephoto end position. As apparent from FIG. 5, the aperture value F decreases in a primary ratio.

FIG. 6 shows the results of detection of the F-number and the focal length f (mm) by means of the encoders 7 and 8. In this case, the F-number values are divided for every 2 EVs into five steps and the focal length value f (mm) into seven steps in a square root multiplied sequence. Figures of constants KF and Kf are used to represent the stepped areas by reducing them in data conversion tables. In the communication from the lens part to the camera part, these tables permit the focal length value f (mm) and the aperture value or F-number to be sent in the form of coefficients KF and Kf.

FIG. 7 shows by way of example duty ratios and driving patterns obtained in a case where the variable driving speeds n=1 to 8 are obtained by controlling the duty ratio of a lens driving pulse motor. The driving speed of the motor can be changed by some other method such as a voltage controlling method. Further, in a case where the motor is provided with rotation detecting means such as a pulse disc or the like, the rotation of the motor is finely adjustable by applying a feedback process to a set duty ratio or voltage. Assuming that a coefficient K is set to be KF+Ff according to the coefficients KF and Kf of FIG. 6 and that a photographing operation is performed at the focal length f=54 mm and the aperture value of F 2.8, the coefficient Kf is 3; the coefficient KF is 2; and thus the coefficient K becomes 3+2=5. Further assuming the value of K at the telephoto end and the full aperture is Kt, the value of this is a fixed intrinsic value of each lens. This value Kt, therefore, can be stored at the microcomputer 12 of the lens part. For example, in the case of a lens of fT=54 mm and the full aperture value Fo 1.4, the value Kt is 4. The value Kt is 3 if the lens is of fT=72 mm and Fo 1.2 or is 2 if the lens is of fT=100 mm and Fo 1.2.

FIG. 8 shows values of $\Delta K = K - Kt$ obtained for a lens of fT=100 mm and the full aperture value Fo 1.4 with various focal length values combined with various aperture values. The telephoto end focal length value and the full aperture value indicate that the value Kt of this lens is 2. For example, when a photographing operation is performed at f=54 mm and F 2.8, the value K is 5 and, therefore, the value $\Delta K$ is $5-2=3$.

FIG. 10 shows the values $\Delta K$ obtained from a lens of fT=54 mm and the full aperture value Fo 1.4. As apparent from the foregoing description, at f=30 mm and F 5.6, for example, the value $\Delta K$ is 3 in the case of the lens of FIG. 10 while it is 5 in the case of FIG. 8. The value $\Delta K$ thus varies, even at the same focal length and the same aperture value, if the telephoto end focal length fT and the full aperture value Fo of the lens vary. The AF device of this embodiment is capable of determining little, middle and great blur states and an in-focus state. In the case of this AF device, the circle-of-confusion expanding speed required in the case of the little or middle blur state is set at 0.32 mm/sec for the little blur state and at 0.45 mm/sec for the middle blur state. Referring to FIG. 3, this means that, with the lens at its telephoto end focal length and at its full aperture, the AF motor is operated at the driving speed n=1 for a little blur state and at the speed n=2 for a middle blur state. In other words, in the case of $\Delta K=0$, the motor speed "n" is at No. 1 for a little blur state and at No. 2 for a middle blur state. Further, referring to FIG. 5, when the aperture value F is shifted two steps from F 1.4 to F 2.8, the motor driving speed "n" is set at No. 3 for a little blur state and at No. 4 for a middle blur state in order to have the same circle-of-confusion varying speeds of 0.32 mm/sec and 0.45 mm/sec. In this instance, the value $\Delta K$ is 1. FIG. 9 shows the values $\Delta K$ in relation to the speeds "n" to be employed for a little blur state and a middle blur state. A table to be used for selection of the speed "n" remains unvarying irrespectively of lens specifications.

In the embodiment described, the aperture value F is detected in a $\times 2$ sequence, i.e., by two steps: 1.4, 2.8, 5.6, .... The focal length f (mm) is detected in a $\times \sqrt{2}$ sequence ($10 \times \sqrt{2} = 1.4$  $14 \times \sqrt{2} = 20$). Therefore, although the speed "n" is indicated by the values 1, 3, 5, 7, ... for a little blur state as shown by way of example in FIG. 9, the speed "n" is not limited to the values of these drawings. The multiplication rates of this embodiment shown above may be changed as desired according to the design of the camera system.

Figure 11:
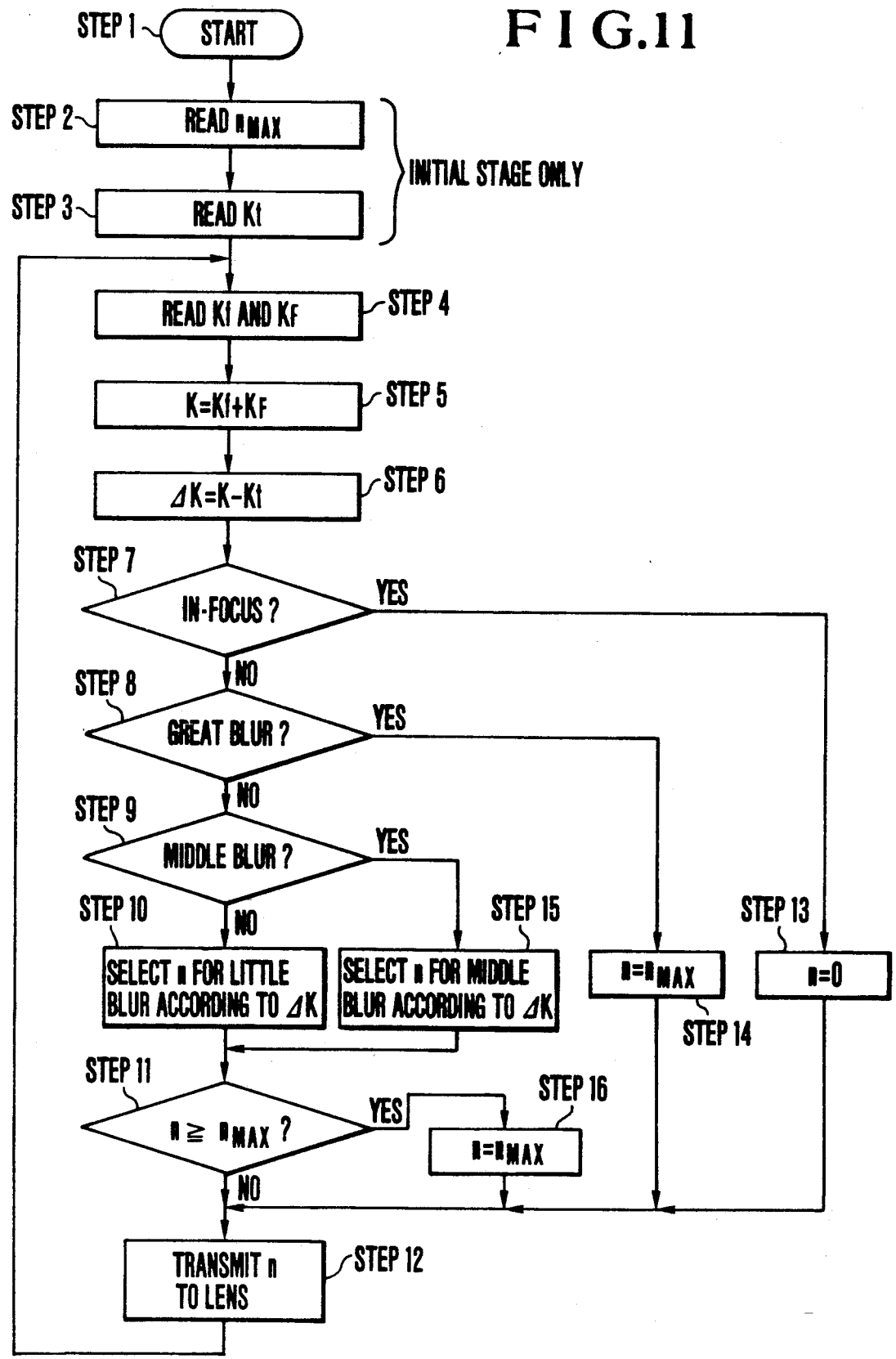
FIG. 11 is a flow chart showing the control operation of a microcomputer provided on the side of the camera body of the embodiment of this invention.

FIG. 11 is a flow chart showing the operation of the microcomputer 16 which is disposed on the side of the camera part of the first embodiment and is arranged on the concept described in the foregoing. Referring to FIG. 11, the operation starts at a step 1. Steps 2 and 3 are provided for initial data communication from the lens part to the camera part when the former is mounted on the latter. At the step 2: The data $n_{MAX}$ (which is at a value 8 when the telephoto end focal length fT of the lens is 100 mm and at another value 5 when fT is 54 mm in the case of FIG. 4) is read out from the lens part. At the step 3: The data Kt which is the value of the coefficient K when the lens is at its telephoto end and at its full aperture is read out from the lens part. The ensuing steps beginning with a step 4 are executed in a cycle of 1/30 sec. Step 4: The current value of the focal length (mm) and the current aperture value F are read from the lens part in the form of data Kf and KF. Step 5: The value of the coefficient $K = Kf + KF$ is obtained. Step 6: The value of data $\Delta K = K - Kt$ is obtained for selection of the driving speed "n". Step 7: A discrimination is made between in-focus and out-of-focus states. If the lens is found to be in the in-focus state, the flow of operation comes to a step 13 to bring the motor to a stop (n=0). If not, the flow proceeds to a step 8. At steps 8 and 9: The focus voltage Vr is compared with the threshold values Vr1 and Vr2 to determine the out-of-focus state of the lens to be a great blur, a middle blur or a little blur. In the event of a great blur (Vr<Vr2), the flow comes to a step 14 to select the maximum driving speed $n_{MAX}$ which shifts the lens from its infinity focusing distance end to its closest focusing distance end within a period of time between 1.5 sec and 2 sec. In cases where the lens position is shiftable at a speed faster than the speed $n_{MAX}$ within the lens shifting time between 1.5 sec and 2 sec or the like apposite to a great blur, the speed "n" may be set at a value different from the $n=n_{MAX}$ at the step 14.

In the case of a little blur (Vr1<Vr) or a middle blur (Vr2<Vr<Vr1), the flow comes to a step 10 or 15 to select the value of the driving speed "n" on the basis of a $\Delta K - n$ conversion table which has been previously prepared as shown in FIG. 9. After selection of the value of the driving speed "n", the flow comes to a step 11, which represents a feature of this invention. At the step 11: A check is made to see if the driving speed "n" set at the step 10 or 15 is higher than the maximum driving speed $n_{MAX}$ ($n \geq n_{MAX}$).

In cases where the focal length f mm is short or if the aperture value F is stopped down while the lens is in a little or middle blur state, the speed "n" for obtaining the circle-of-confusion varying speed $\Delta Zn = 0.32$ might be too slow even if it is set at the maximum speed $n_{MAX}$, for example, for a little blur. In such a case, the flow comes to a step 16 to set the driving speed "n" at the maximum speed $n_{MAX}$. As mentioned in the foregoing, in respect of hunting or the like, the circle-of-confusion varying speed $\Delta Zn$ slower than 0.32 mm/sec might be questionable. However, since the local length is changed from the wide-angle side of the lens, such a slow varying speed presents no problem in most cases. After a driving speed instruction value "n" is obtained through the steps described, the flow comes to a step 12 to transmit the value of the speed "n" to the lens part for driving the lens. This lens driving action is performed according to the driving pattern shown in FIG. 7.

In the foregoing, the first embodiment is described with respect to the maximum driving speed $n_{MAX}$. Description in respect to the minimum driving speed $n_{MIN}$ is as follows:

In the case of the minimum driving speed $n_{MIN}$, as mentioned in the foregoing, its relation to a distance measuring cycle is important. Assuming that the lens is in a condition of $\Delta Zn = 0.45$ mm/sec, that is, the minimum driving speed $n_{MIN}$ is at $n=2$ as shown in FIG. 3 and the distance measuring cycle is 1/30 sec, the circle of confusion is 0.015 mm. Then, if the AF signal processing circuit 25 is arranged to consider 0.013 mm to be the minimum circle of confusion, the minimum driving speed $n_{MIN}=2$ of this lens presents a problem while $n_{MIN}=1$ would present no problem. In such a case, conceivable solutions of the problem include: (1) The distance measuring cycle is somehow shortened. (2) The setting value of minimum circle of confusion is somehow increased. (3) The operation is inhibited. In accordance with the method (2), the allowable degree of blur degrades in determining an in-focus state. In actuality, however, the rate of scenes determined to be in focus decreases from 99% only to 97%. This is a minor deterioration in performance. Compared with the method (3) of inhibiting the operation, the method (2) is much more practicable. As to the method (1), it might be technically difficult.

Figure 12:
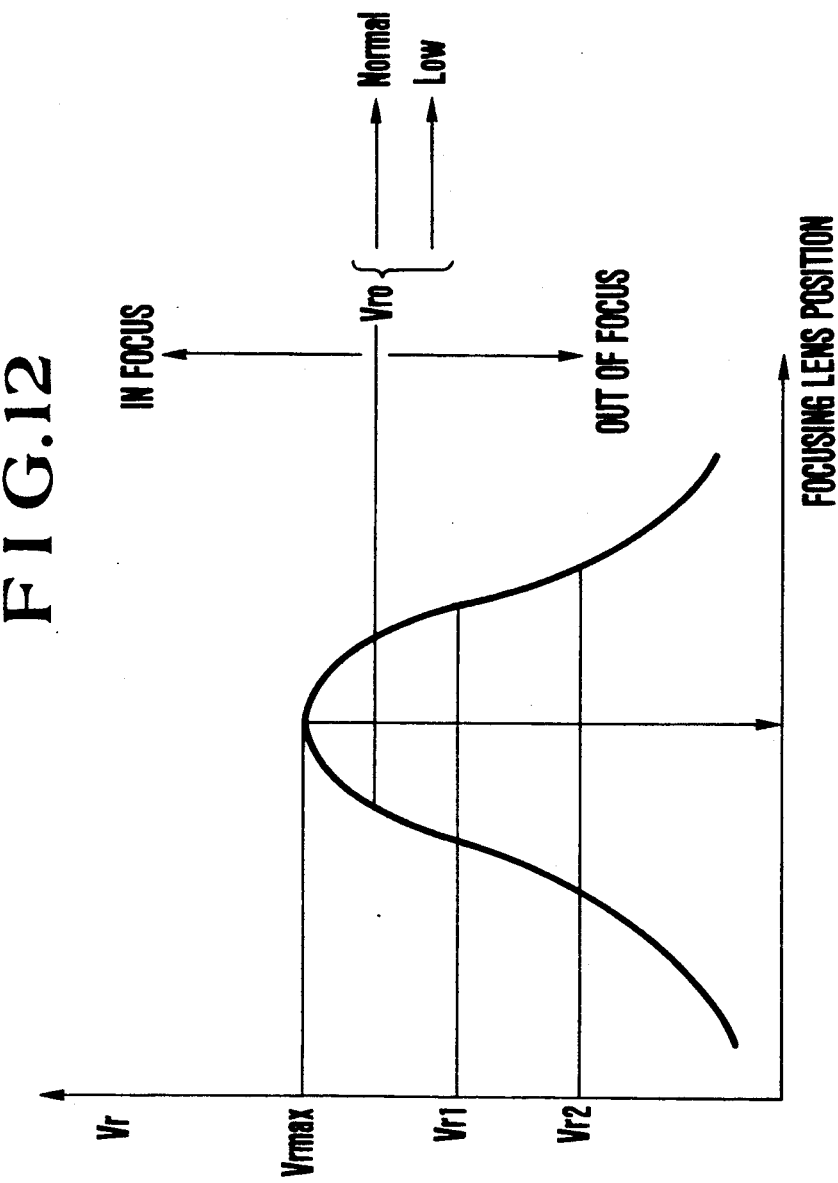
FIG. 12 is a graph showing the focus indicating voltage values of an AF signal processing circuit in relation to lens positions.

FIG. 12 is a graph showing the characteristic of the AF signal processing circuit 25 of FIG. 2. The focus voltage Vr is shown on the axis of ordinate and the lens position on the axis of abscissa. Assuming that a level to be used for discrimination between in-focus and out-of-focus states is Vro, the embodiment is arranged to allow the discrimination level to be set at one of two values including a value "Vro Normal" for a higher degree of focusing precision and a value "Vro Low" for lower degree of focusing precision.

Figure 13:
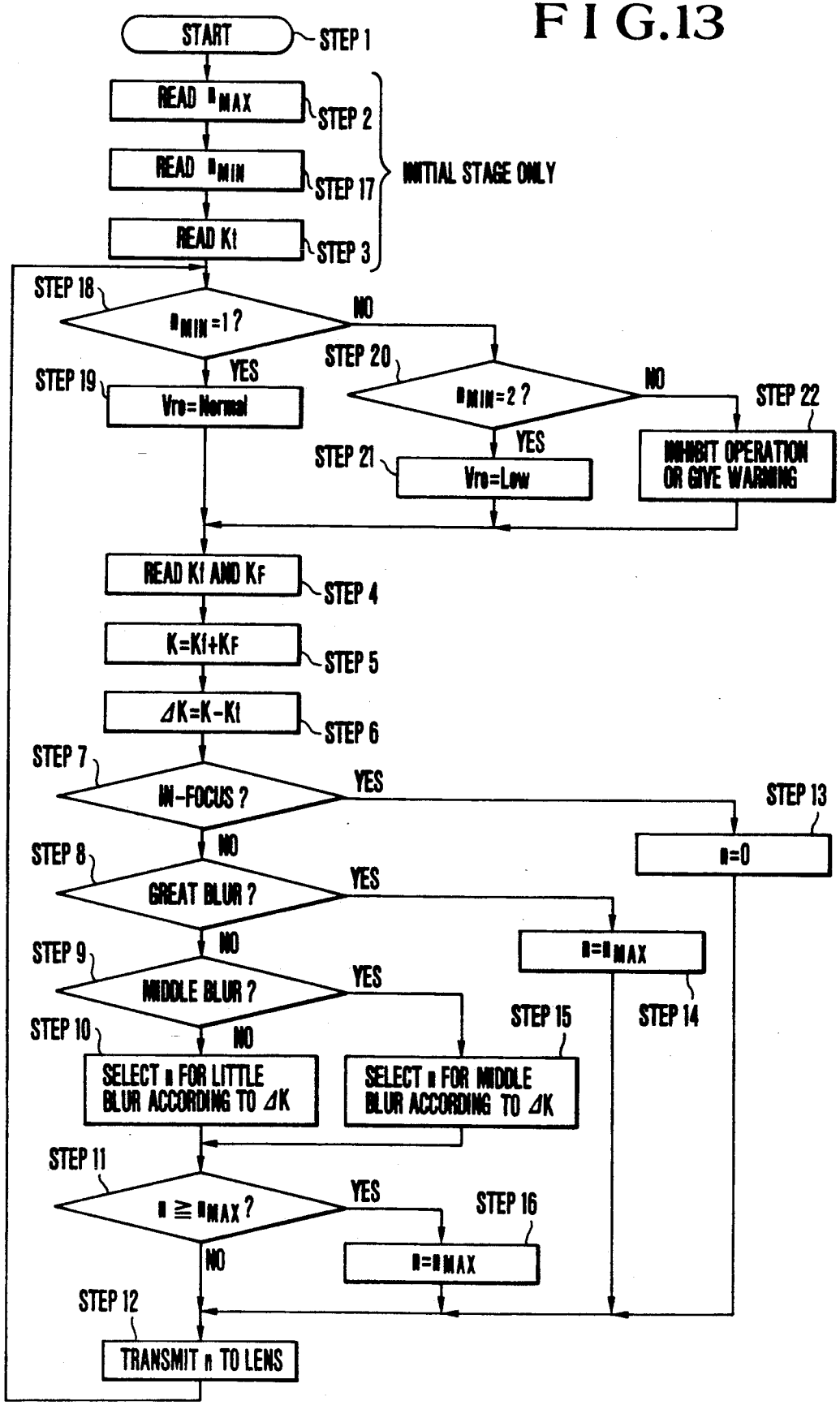
FIG. 13 is a flow chart showing the AF action of a first embodiment of the invention.

FIG. 13 is a flow chart showing a part of the control operation of the microcomputer 16 of the camera part including selection between the two discrimination level values "Vro Normal" and "Vro Low". The latter half of the flow continues to the step 4 and ensuing steps of FIG. 11. Therefore, the latter half of the flow chart is omitted from the following description. In the initial stage of communication, the microcomputer 16 reads also the minimum speed $n_{MIN}$. At steps 18 and 20: The value $n_{MIN}$ is checked to find if it is the driving speed 1, 2 or 3 or higher than 3. If the value $n_{MIN}$ is found to be 1 the flow comes to a step 19 to set the discrimination level Vro at the value "Normal". If the value $n_{MIN}$ is found to be 2, the flow comes to a step 21 to set the level Vro at the value "Low". If the value $n_{MIN}$ is found to be equal to or higher than 3, the flow comes to a step 22 either to inhibit the operation of the system or to give a warning.

During the operation described above, the focal length f and the aperture value F is converted into the coefficient values Kf and KF and an optimum speed No. is selected accordingly. Meanwhile, the value K mentioned in the foregoing changes by one when either the focal length f changes as much as $X\sqrt{2}$ or the aperture value changes as much as X 2. Therefore, the process of conversion into Kf and KF may be replaced with a process of obtaining $\Delta K = m + l$ with m and l computed according to the following two formulas:

$$fT = f \times (\sqrt{2})^m$$

$$F = l \times Fo$$

For example, in the case of a lens of $fT=110$ mm and $Fo=1.4$, the values m and l are computed and obtained from the above two formulas as $m=2$ and $l=2$ when the lens is at $f=56$ and $F=5.6$. In this instance the value of $\Delta K$ becomes 4. Therefore, the advantageous effect of the invention is attainable in the same manner even with the system arranged in this manner.

While the AF driving means of the first embodiment has been described in detail in the foregoing, these details apply also to other driving means, i.e., the AE and PZ driving means.

Figure 14:
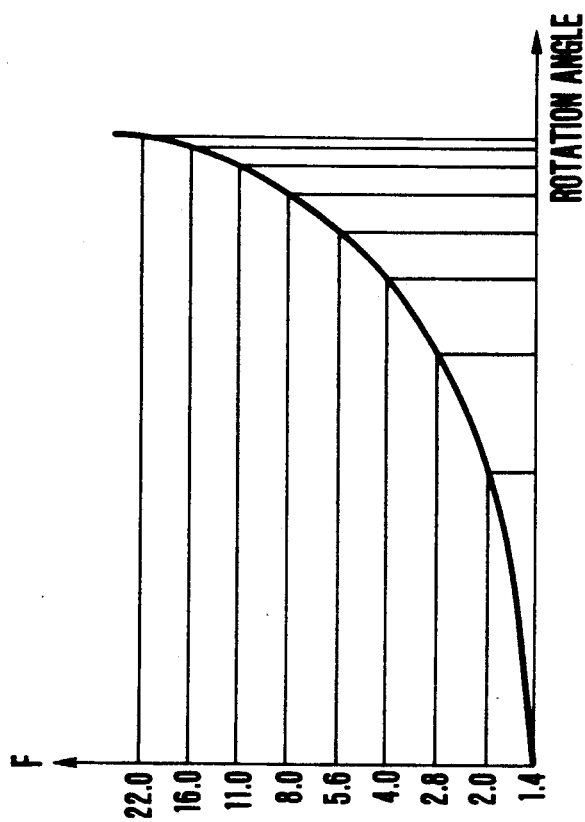
FIG. 14 is a table showing the details of speed setting for a zoom device.

With respect to zooming, for example, the relation between the driving speed "n" and the length of time required in shifting the lens position from telephoto end T and the wide-angle end W is specified as shown in FIG. 14. However, in the case of most simplified arrangement, the system may be arranged to have a single zooming speed. In that case, with both the minimum and maximum driving speeds set, for example, at 6, the possible speed is limited to the speed 6. Therefore, when the zoom switch is pushed, the lens part is instructed to shift the lens position at a uniform driving speed $n=6$.

In the case of variable speed zooming, the system is capable of appositely varying its operation stepwise within the range between the minimum and maximum driving speeds $n_{MIN}$ and $n_{MAX}$.

Further, if the camera part is arranged to be incapable of responding to variable speed zooming while the lens part is arranged to be capable of lens driving at varied speeds between the speeds 6, 7 and 8, for example, the system may be arranged to select one speed "n" which is closest to the zoom ratio of the lens among the possible driving speeds. Software control over the PZ action is as shown in FIG. 16 which is a flow chart.

Figure 16:
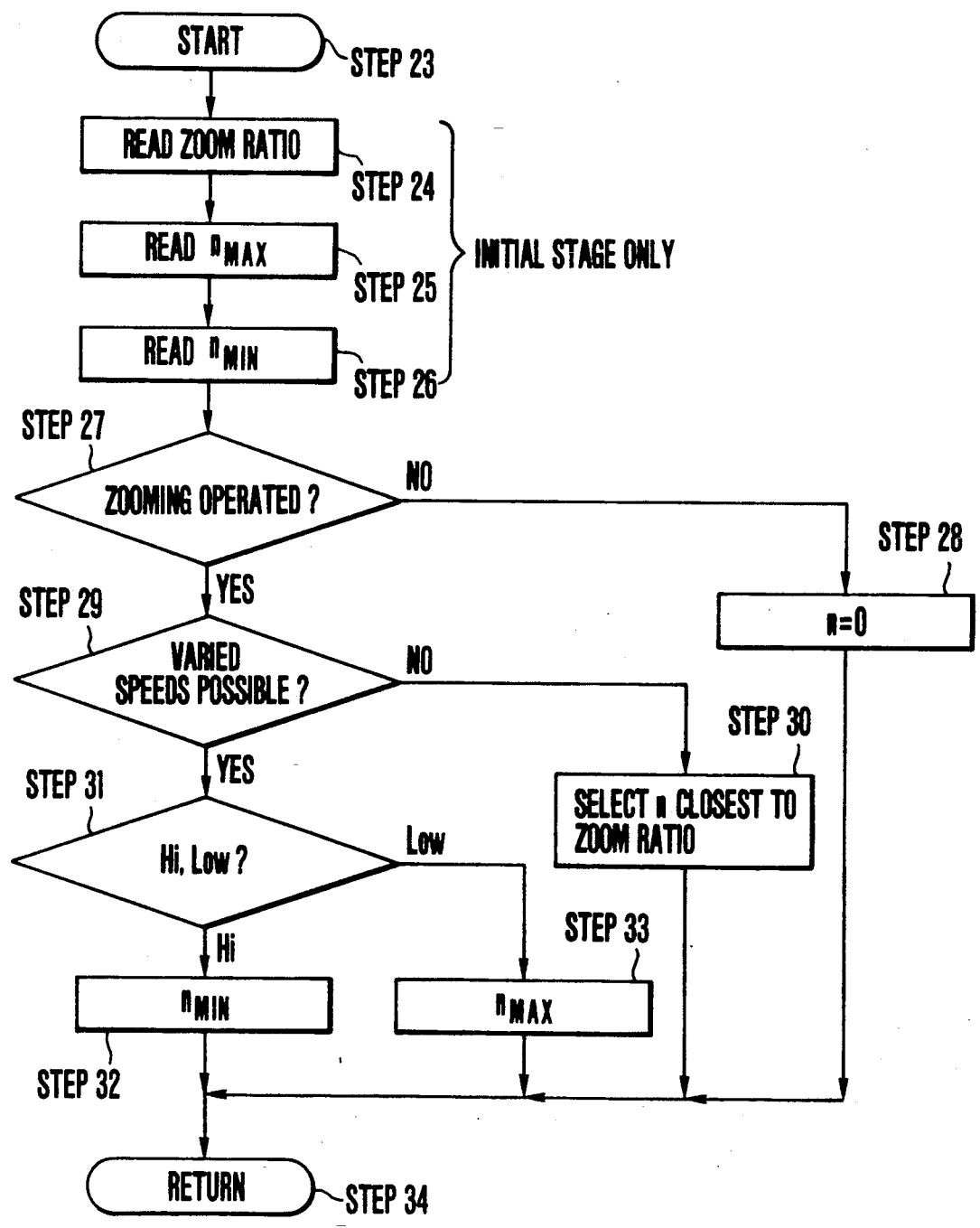
FIG. 16 is a flow chart showing a zooming action.

FIG. 16 shows the PZ control operation of the microcomputer 16 which is disposed on the side of the camera part. The operation starts at a step 23. At the steps 24, 25 and 26: The microcomputer 16 reads out from the lens part the zoom ratio, the minimum driving speed $n_{MIN}$ and the maximum driving speed $n_{MAX}$. At a step 27: A check is made to see if the zoom switch 26 has been operated. If not, the flow comes to a step 28 to have the zoom lens drive circuit 22 stationary, i.e., to select the speed $n=0$. If the zoom switch 26 is found to have been operated, the flow comes to a step 29. At the step 29: A check is made to see if the camera system permits use of varied speeds. If not, the flow comes to a step 30. At the step 30: Within a possible range, a speed "n" which is closest to the zoom ratio is selected.

Further, in a case where use of varied speeds is found to be possible at the step 29, the flow comes to a step 31. Step 31: If selection of one of two speeds "Hi" (high) and "Low" (low) is possible, the speed "Hi" or "Low" is selected. In the case of the speed "Low", the flow comes to a step 33 to select the maximum speed $n_{MAX}$. If the speed "Hi" is selected, the flow comes to a step 32 to select the minimum speed $n_{MIN}$. Then, the zoom control routine comes to an end and the flow returns at the step 34.

Figure 15:
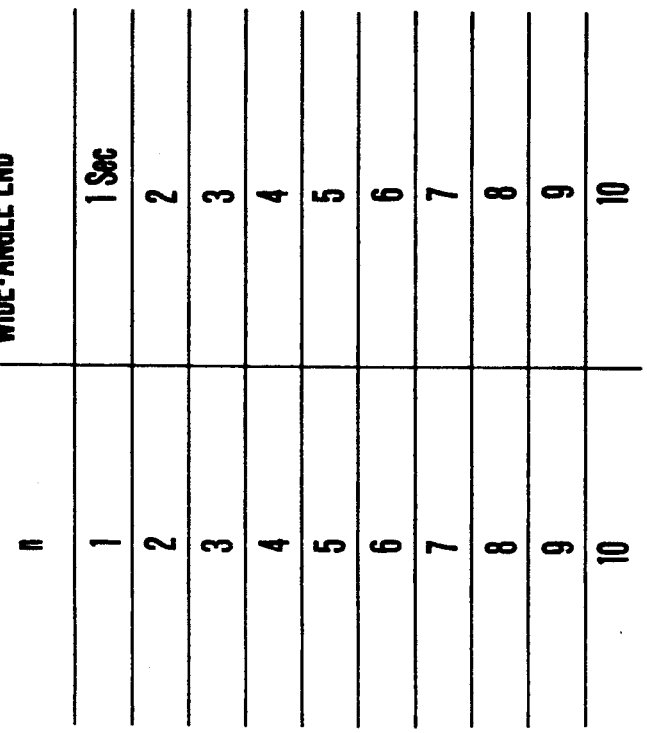
FIG. 15 is a graph showing a characteristic curve of a diaphragm.

FIG. 15 shows a most generic characteristic curve. The rotation angle of an aperture meter for a video camera is shown on the axis of abscissa and the aperture value F on the axis of ordinate. As apparent from FIG. 15, there is a conspicuous difference in the rotation angle necessary for obtaining the same degree of change in Av (aperture value) between a point near to the full aperture and a stopped down point of the aperture. In the case of AE operation, therefore, arrangement to have the above-stated drive speed "n" specified in the form of such a varying speed as ΔAv (1/sec) makes the varying speed setting difficult, because: It is difficult to set an excessively high varying speed for an aperture value close to the full aperture and to set an excessively low varying speed for a stopped down aperture.

In the case of AE operation, therefore, it is necessary to transmit the maximum and minimum driving speeds $n_{MAX}$ and $n_{MIN}$ in the initial stage of the communication. For example, data of $1 \leq n \leq 3$ must be transmitted, in the initial stage, for an aperture value F 1.4 and data of $4 \leq n \leq 8$ for an aperture value F 11.0.

Upon receipt of data of this value, the microcomputer 16 of the camera part determines a driving speed "n" apposite to each applicable aperture value in the same manner as in the case of the AF operation.

Next, the following describes another (second) embodiment of the invention: In the case of the first embodiment, the maximum and minimum speeds $n_{MAX}$ and $n_{MIN}$ are transmitted from the lens part to the camera part. Then, the microcomputer 16 of the camera part is arranged not to send to the microcomputer 12 of the lens part any speed instruction that is inexecutable by the driving means disposed on the side of the lens part.

Whereas, the second embodiment is arranged to have the maximum and minimum speeds $n_{MAX}$ and $n_{MIN}$ not sent to the microcomputer 16 of the camera part. Meanwhile, the microcomputer 12 of the lens part is arranged to determine the speed value "n" received from the microcomputer 16 of the camera part as to whether it is executable.

Figure 17:
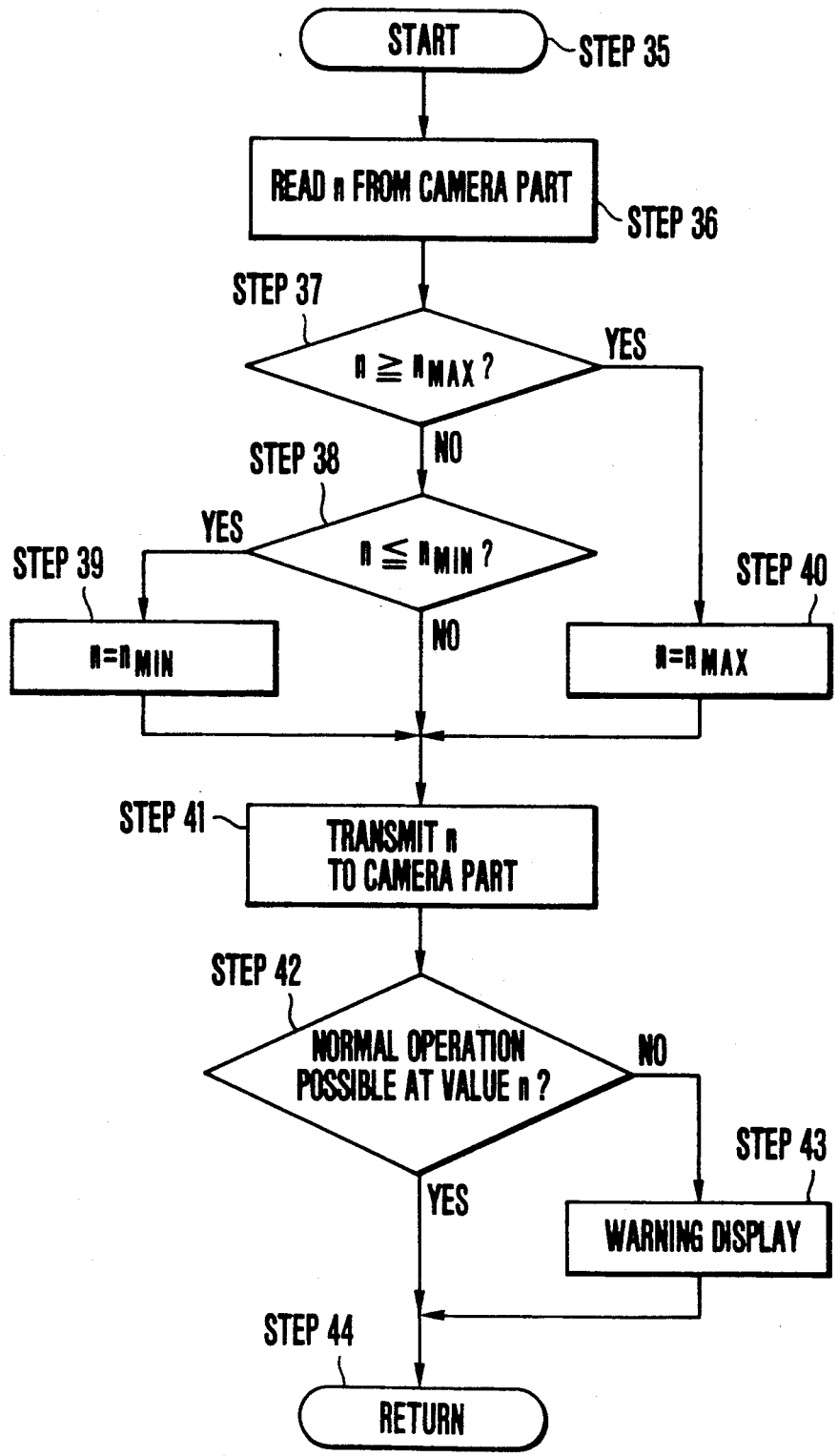
FIG. 17 is a flow chart showing the operation of a microcomputer disposed on the side of a lens unit of a second embodiment.

FIG. 17 is a flow chart showing the operation of the microcomputer 12 of the lens part. The operation starts at a step 35. At a step 36: In response to an instruction from the camera part, an instructed speed value "n" for the applicable driving means is read. At a step 37: A check is made to find if the speed value "n" is equal to or higher than the maximum speed value $n_{MAX}$. If so, the flow comes to a step 40 to set the speed "n" at the maximum speed $n_{MAX}$. If not, the flow comes to a step 38. At the step 38: The speed "n" is checked to find if it is equal to or less than the minimum speed value $n_{MIN}$. If so, the flow comes to a step 39 to set the speed "n" at the minimum speed $n_{MIN}$.

At a step 41: The final speed value "n" is sent from the lens part to the camera part. Step 42: A check is made on the side of the camera part to see if the normal operation is possible at the the speed value "n" returned from the lens part. If not, the flow comes to a step 43 to make, for instance, a warning display. After that, the flow comes to a step 44 to return from this routine. Further, with the driving means assumed to be a DC motor, the driving patterns of FIG. 7 are usable for varying the driving speed of the motor according to the speed value "n" by controlling the duty ratio of the motor terminal.

As described in the foregoing, the lens-interchangeable camera system has more than one speed specified for each of the driving means disposed on the side of the lens part. In a case where the driving means is incapable of driving at any of the speeds specified, a speed most apposite to the control of the driving means is selected according to the maximum and minimum possible driving speeds. If a normal operation is still impossible despite such speed selection, a warning is given in a suitable manner. Such being the arrangement, the camera system according to this invention is capable of performing a normal operation as much as possible even in the event of an instruction for an inexecutable driving speed. The invention, therefore, obviates the necessity of providing the camera system with such driving means that is capable of operating at a wide range of driving speeds including speeds seldom necessary for the actual operation of the camera system. The invented camera system thus permits the driving means to be easily arranged. It is another advantage of the invention that the arrangement of the control circuit which is required for the varied driving speeds can be simplified.

What is claimed is:

1. A camera system having a camera body and a lens unit detachably mounted on said camera body, comprising:
    a) communication means for communicating information for controlling said lens unit from said camera body between said lens unit and said camera body;
    b) an actuator disposed in said lens unit for adjusting an optical condition of said lens unit;
    c) driving control means arranged in said camera body to supply a driving instruction signal for driving said actuator to said lens unit through said communication means; and
    d) limiting means arranged in said camera body to take in information on a driving characteristic of said actuator from said lens unit through said communication means and to limit an institution of said driving instruction signal by controlling said driving control means in accordance with said driving characteristic, said communication means being arranged to transmit said information on the driving characteristic from said lens unit to said camera body through an initial communication made between said lens unit and said camera body for initializing said camera body and said lens unit.

2. A camera system according to claim 1, wherein said driving control means is arranged to set information on a driving speed of said actuator and to supply said information to said lens unit.

3. A camera system according to claim 2, wherein said limiting means is arranged to receive, from said lens unit, information on at least one of the maximum and minimum possible driving speeds of said actuator and to limit said driving instruction signal of said driving control means to prevent said signal from exceeding a range of driving speeds defined by said maximum or minimum possible driving speed.

4. A camera system according to claim 1, wherein said lens unit includes focus adjusting means, and wherein said actuator is arranged to drive a focusing lens provided for focus adjustment.

5. A camera system according to claim 4, further comprising focus detecting means arranged in said camera body to detect a focusing state of said lens unit.

6. A camera system according to claim 5, wherein said driving control means is arranged to set a driving speed of said focusing lens on the basis of an output of said focus detecting means produced according to the degree of blur of said lens unit.

7. A camera system according to claim 6, wherein said limiting means is arranged to take in, from said lens unit, information on at least one of the maximum and minimum speeds of said focusing lens and to control the driving speed of said focusing lens set by said driving control means to prevent said driving speed from exceeding said maximum or minimum driving speed.

8. A camera system according to claim 6, wherein said driving control means is further arranged to set the driving speed on the basis of the varying degree of the diameter of a circle of confusion resulting from a shift of position of said focusing lens.

9. A camera system according to claim 8, wherein said driving control means is further arranged to set the driving speed of said focusing lens by taking in, through said communication means, information on the depth of field of said lens unit.

10. A camera system according to claim 4, wherein said communication means is arranged to transmit said information on the driving characteristic from said lens unit to said camera body through initial communication made in response to mounting of said lens unit on said camera body.

11. A camera system according to claim 1, wherein said communication means performs communication between said lens unit and said camera body in synchronism with the period of a vertical synchronizing signal.

12. A camera system according to claim 1, wherein said lens unit and said camera body are respectively provided with control microcomputers, and wherein said communication means is arranged to perform communication of information between said microcomputers.

13. A camera apparatus adapted to have a lens unit detachably mounted thereon, comprising:
   a) control means arranged to set a driving speed for driving an actuator disposed in said lens unit and adjusting an optical condition of said lens unit and to supply information on said driving speed to said lens unit; and
   b) correcting means arranged to detect at least one of the maximum and minimum values of possible driving speeds of said actuator by an initial communication made on the basis of mounting of said lens unit on said camera body and to cause the setting range of driving speeds set by said control means to be limited according to the result of detection so that said driving speed remains within said maximum and minimum values.

14. A camera apparatus according to claim 13, wherein said actuator is arranged to drive focus adjustment means disposed in said lens unit.

15. A camera apparatus according to claim 14, wherein said control means is arranged to set the driving speed of said actuator at such a value that makes unvarying the varying degree of a circle of confusion taking place per unit shifting degree of said focus adjustment means.

16. A camera apparatus according to claim 14, further comprising focus detecting means arranged to detect a focusing state of said lens unit.

17. A camera apparatus according to claim 16, wherein said control means is arranged to change the driving speed of said actuator according to the degree of blur of said lens unit detected by said focus detecting means.

18. A camera apparatus according to claim 17, wherein said control means is arranged to detect the depth of field of said lens unit and to further change the driving speed of said actuator according to said depth of field.

19. A camera apparatus according to claim 13, further comprising communication means formed enabled by a mounting action by which said lens unit is mounted on said camera apparatus, said communication means being arranged to perform communication of information on the driving speed of said actuator from said control means and information on the possible driving speed range of said actuator from said lens unit.

20. A camera apparatus according to claim 19, wherein said communication is arranged to be made in synchronism with a vertical synchronizing signal.

21. A camera apparatus according to claim 13, wherein said control means and said correction means are formed by a microcomputer disposed in said camera apparatus.

22. An automatic focusing device comprising:
   a) focus adjusting means arranged in a lens unit to adjust a focus condition of said lens unit;
   b) driving control means for controlling said focus adjustment means from a camera body by supplying a driving speed instruction signal to said lens unit; and
   c) correcting means arranged to detect the range of possible driving speeds of said focus adjustment means on the basis of information received from said lens unit through an initial communication made between said camera body and said lens unit on the basis of mounting of said lens unit on said camera body and to correct said driving speed instruction signal to prevent said signal from exceeding said range.

23. A device according to claim 22, further comprising focus detecting means arranged in said camera body to detect a focusing state of said lens unit.

24. A device according to claim 23, wherein said driving control means is arranged to set a driving speed of said focusing lens on the basis of an output of said focus detecting means produced according to the degree of blur of said lens unit.

25. A device according to claim 24, wherein said limiting means is arranged to take in, from said lens unit, information on at least one of the maximum and minimum speeds of said focusing lens and to control the driving speed of said focusing lens set by said driving control means to prevent said driving speed from exceeding said maximum or minimum driving speed.

26. A device according to claim 25, wherein said driving control means is further arranged to set the driving speed on the basis of the varying degree of the diameter of a circle of confusion resulting from a shift of position of said focusing lens.

27. A device according to claim 26, wherein said driving control means is further arranged to set the driving speed of said focusing lens by taking in, through said communication means, information on the depth of field of said lens unit.

28. A lens unit adapted to be detachably mounted on a camera apparatus, comprising:
   a) control means arranged on the side of said lens unit to control, on the basis of control information received from said camera apparatus, an actuator arranged to change an optical condition of said lens unit in said lens unit; and
   b) transmission means for transmitting, in response to a request from said camera apparatus, information related to the range of possible driving speeds of said actuator to said camera system, said information being used to decide said control information, and said transmission means being arranged to transmit information in synchronism with a vertical synchronizing signal.

29. A lens unit according to claim 28, wherein said actuator is arranged to drive a focusing lens.

30. A lens unit according to claim 28, wherein said transmission means is further arranged to transmit information on the depth of field of said lens unit to said camera apparatus.

31. A lens unit according to claim 28, wherein said information on the possible driving speed range includes at least one of the maximum and minimum driving speeds of said actuator.

32. A lens unit according to claim 28, wherein said control means is a microcomputer.

* * * * *

UNITED STATES PATENT AND TRADEMARK OFFICE
CERTIFICATE OF CORRECTION

PATENT NO. : 5,153,629
DATED : October 6, 1992
INVENTOR(S) : Naoya Kaneda It is certified that error appears in the above-identified patent and that said Letters Patent is hereby corrected as shown below:

Abstract, line 7.  Change "on" second occurrence to -- one --
Col. 1, line 51.  Change "occurred" to -- occurring --
Col. 7, line 68.  Change "ZnX(f/fT)$^2$" to -- $\Delta$ Zn X (fXfT)2 --
Col. 11, lines 27, 28 and 54.  Change "AK" to -- $\Delta$K --
Col. 13, line 63.  Change "m + 1" to -- m + $\ell$ --
Col. 13, line 63.  Change "m and 1" to -- m and $\ell$ --
Col. 14, line 2.  Change "F=1xFo" to F= $\ell$ x Fo --
Col. 14, line 5.  Change "1" to -- $\ell$ --
Col. 14, line 6.  Change "1=2" to -- $\ell$ = 2 --
Col. 15, line 6.  Change "1/sec" to -- $\ell$ /sec --

Signed and Sealed this

Sixteenth Day of November, 1993

Attest:

BRUCE LEHMAN

*Attesting Officer*    *Commissioner of Patents and Trademarks*